United States Patent [19]

Won

[11] 4,310,066
[45] Jan. 12, 1982

[54] TORSIONAL SHEAR WAVE GENERATOR

[76] Inventor: Ihn J. Won, 319 Morrison Ave., Raleigh, N.C. 27608

[21] Appl. No.: 123,651

[22] Filed: Feb. 22, 1980

[51] Int. Cl.$^3$ .............................................. G01V 1/053
[52] U.S. Cl. ................................... 181/121; 181/401
[58] Field of Search .................. 181/121, 401; 367/75

[56] References Cited

U.S. PATENT DOCUMENTS

| | | | |
|---|---|---|---|
| 2,740,489 | 4/1956 | White et al. | 181/401 |
| 2,760,591 | 8/1956 | White et al. | 181/401 |
| 3,552,195 | 12/1968 | Koprowski | 73/101 |
| 3,716,111 | 2/1973 | Laverene | 181/401 |
| 4,103,756 | 8/1978 | Trulio et al. | 181/401 |

OTHER PUBLICATIONS

Richards, "Marine Geotechnology," 1979, pp. 1-22, vol. 3, Crane, Russak & Co., Inc.; 536M338v.3.
Poplin et al. "Evaluation of the Vane Shear Test in Louisiana," 12/78, pp. 1-219, Report FHWA-LA-7-8-207L.

Primary Examiner—Nelson Moskowitz
Attorney, Agent, or Firm—Mills and Coats

[57] ABSTRACT

The present invention relates to a torsional shear wave generator for producing clean horizontally polarized seismic shear waves that can be utilized in investigating the earth's subsurface. Basically the torsional shear wave generator of the present invention comprises a hollow elongated shaft having a plurality of circumferentially spaced vanes radially projecting therefrom. Secured to a top portion of the shaft, as normally positioned in the ground, is a loading arm that extends generally perpendicular to the longitudinal axis of said shaft. In some cases, the central shaft is not necessary if the vanes can be joined by other means such as welding.

4 Claims, 3 Drawing Figures

TORSIONAL SHEAR WAVE GENERATOR

The present invention relates to devices used for geophysical investigation of the earth's subsurface, and more particularly to a relatively simple torsional shear wave generator that is designed such that it can be used to accurately and efficiently determine in-situ shear wave velocities of the ground as a function of depth.

BACKGROUND OF INVENTION

Today the state of the art in the area of geotechnical and geophysical investigation is such that velocity profiles for both shear and compressional waves, of the ground, are routinely used in the investigation of construction sites, foundation materials, as well as in the investigation of subsurface earth resources. In-situ dynamic material parameters and elastic moduli of the earth's material can be determined by making use of the velocity data of both shear and compressional waves. For example, regarding geotechnical and geophysical investigation of the earth, such dynamic material parameters include Young's modulus, shear modulus and Poisson's ratio.

In this regard, one principal concern in geophysical investigation of the earth's subsurface is to determine the shear wave velocity. This can be accurately and efficiently accomplished by generating a pure shear wave and then isolating the shear wave from other associated wave forms, such as compressional waves. If the corresponding compressional wave velocity can be measured simultaneously, then it follows that the aforementioned dynamic material parameters can be arrived at by using known relationships involving both shear and compressional wave velocities.

In order to better understanding shear and compressional waves and the distinction therebetween, it may be beneficial to give a closer view towards the same. A compressional wave is an elastic wave and is characterized by longitudinal particle movement during the wave propagation. Also there is an associated elastic volume change. A shear wave on the other hand is characterized by transverse particle movement with no associated elastic volume change. Generally, shear waves travel at a slower velocity than compressional waves, and, therefore, are observed after the compressional wave arrival and in some cases shear waves can be obscured by the compressional wave arrival.

It should be understood that with respect to a shear wave the particle motion occurs in a transverse plane with respect to the direction of propagation, which means that the shear wave can be deemed a vertical shear wave or a horizontal shear wave, depending on the direction of transverse movement.

With respect to the generation of horizontal shear waves, there are methods in use today. For example, one such method involves hitting the end of a log which rests under the front wheels of a parked truck. Another method involves the use of dynamic vane torque devices which supply continuous vibration to the soil. Such continuous vane torque devices do produce good results but the disadvantages of such are that this type of equipment is heavy and complex and includes a great deal of bulky electronic equipment that besides being expensive, is often not practical in remote localities such as densely forested areas.

Therefore, there is a real need for a practical field device that is relatively simple and inexpensive, which can be utilized to determine subsurface shear wave velocities.

SUMMARY OF INVENTION

The present invention relates to a practical field vane torque device that is designed to generate and isolate horizontal shear waves.

The device of the present invention is referred to as a torsional shear wave generator and structurally the device comprises an elongated hollow steel shaft adapted to be driven a selected depth in the ground and which includes a plurality of radially extending vanes. Secured to the top portion of the shaft is a loading arm that extends outwardly therefrom generally perpendicular to the longitudinal axis of the shaft. The central shaft may not be necessary if the vanes can be joined by other means such as welding.

Once the shaft has been positioned in a selected location, a horizontal shear wave may be produced by striking the loading arm with a controlled and/or predetermined force. As discussed subsequently herein, the generated seismic wave forms can be measured and recorded with conventional seismic recording equipment.

It is, therefore, an object of the present invention to provide a torsional shear wave generator for isolating horizontally polarized shear waves and ultimately enabling one to determine shear wave velocity.

Another object of the present invention is to provide a torsional shear wave generator of the character just described that is practical, relatively simple and inexpensive, rugged and durable, and which is portable and easy to use.

Still a further object of the present invention is to provide a torsional shear wave generator that is capable of generating relatively pure shear wave energy and that produces minimum or negligible compressional wave energy.

Another object of the present invention is to provide a torsional shear wave generator of the character referred to above that produces compressional waves of relatively low magnitude in order that the compressional and shear waves can be recognized simultaneously from a seismic record.

It is also an object of the present invention to provide a torsional shear wave generator of the character referred to above which can be produced in the form of a portable and lightweight unit for engineering applications.

Other objects and advantages of the present invention will become apparent from a study of the following description and the accompanying drawings which are merely illustrative of the present invention.

DESCRIPTION OF PREFERRED EMBODIMENT

Figure 2:
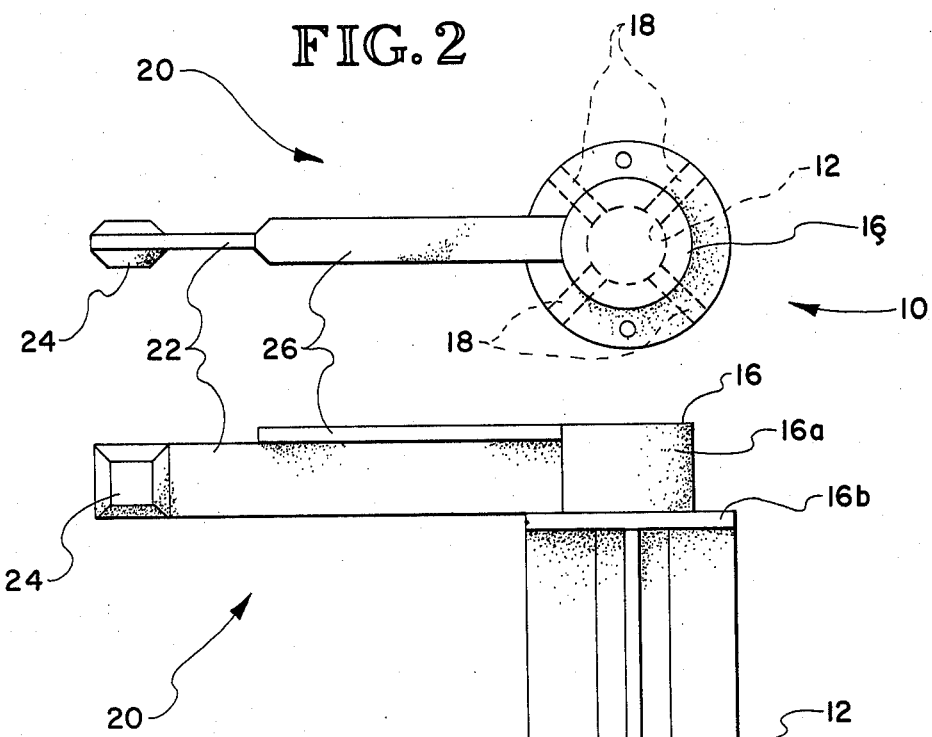
FIG. 2 is a top plan view of the torsional shear wave generator.
Figure 1:
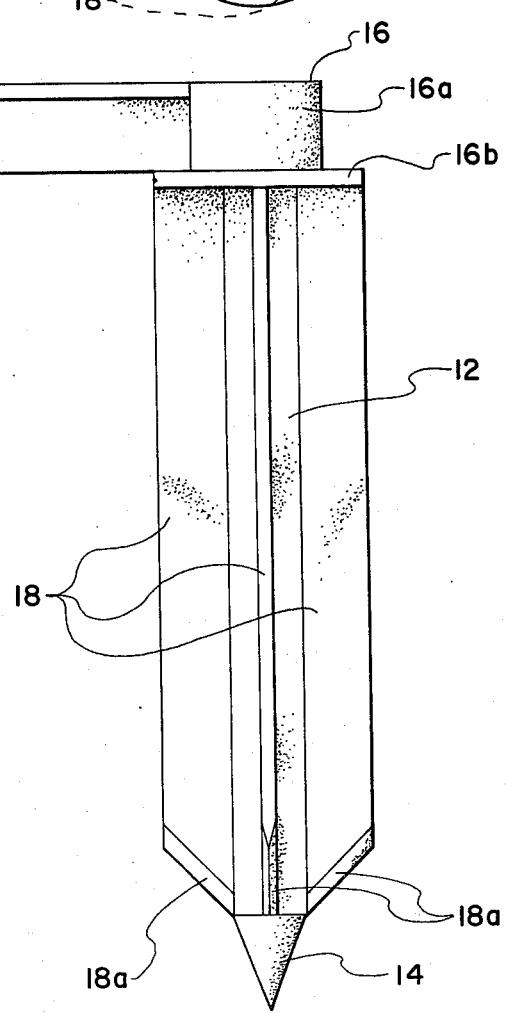
FIG. 1 is a side elevational view of the torsional shear wave generator of the present invention.

With further reference to the drawings, particularly FIG. 1, the torsional shear wave generator of the present invention is shown therein and indicated generally by numeral 10.

Viewing the structure of the torsional shear wave generator 10, it is seen that the same includes an elongated hollow shaft 12 that in a preferred embodiment is constructed of steel or other suitable material. Formed about the lower portion of shaft 12 is a spike end 14 that enables shaft 12 to be more easily driven to the earth.

Secured about the opposite end of shaft 12 is a driving head 16 that includes a circular plate 16b secured to the top of shaft 12 and a collar 16a secured to the top of plate 16b and generally concentrically aligned with plate 16b and the longitudinal axis of shaft 12.

Secured to the outer side wall structure of shaft 12 is a series of vanes 18. The purpose of shaft 12 is mainly to support vanes 18. If vanes 18 can be joined by such means as welding, the shaft 12 may not be necessary. Generally, it is contemplated that the torsional shear wave generator 10 would include at least two vanes 18, but in the preferred embodiment illustrated herein, the same includes four vanes 18 with each vane being generally equally circumferentially spaced apart about shaft 12.

As illustrated in FIG. 1, the lower end 18a of each vane, also referred to as the leading edge, is beveled and cut at an incline to facilitate the implanting of the torsional shear wave generator 10 within the earth.

Secured to the driving head 16 is a loading arm assembly, indicated generally by the numeral 20. Loading arm assembly 20 includes an arm 22 secured to the driving head 16 and projecting radially therefrom in a direction generally perpendicular to the longitudinal axis of shaft 12. Formed about the remote outer end of arm 22 is an impact head 24 that is adapted to receive impact blows from a controllable force. For strengthening the structure, there is provided a top bracket or gusset 26 that extends from adjacent collar 16a a selected distance along the top edge of arm 22.

The torsional shear wave generator 10, when built for shallow geotechnical investigation, may weigh less than 30 pounds, and as such is quite portable. It has been determined, however, that the size of the device is not extremely important as long as the vanes 18 are sufficiently large and rigid enough to resist breakage and to produce an elastic deformation.

In operation, to utilize the torsional shear wave generator 10 of the present invention, a hole may be bored in the earth's surface approximately the diameter of shaft 12 in order to facilitate driving the device into the ground by a sledge hammer. For a torsional shear wave generator without central shaft, such boring is not necessary.

After the torsional shear wave generator has been appropriately positioned, a horizontal shear wave may be produced by striking the impact head 24 of the loading arm assembly 20 with a controlled force such as a sledge hammer. A shear wave may be polarized not only as to plane but also by direction (either clockwise or counterclockwise). For example, if after the impact head 24 is struck once, the same head is struck a second time with the same force but from the opposite side, the same wave with reverse polarity will be excited. It is this distinct property of shear waves that has enabled individuals to isolate shear waves from compressible waves.

The energy or impact force applied to the loading arm assembly 20 may be generated by any form which produces a controlled, consistent and repeatable force. For example, a few of the methods that would be appropriate include a spring loaded hammer which, when released, would rotate to meet the impact head 24; a pendulum and mass system; an impact force produced by a slug fired from a compressed air barrel system; a human swing of a sledge hammer, or a dead blow hammer. In tests produced, the human swing proved to be satisfactory, although less repeatable in wave form.

In conventional fashion with standard commercially available seismic recording equipment, measurement can be made of the arriving seismic wave forms. To measure arriving shear waves, horizontal geophones may be placed at desired distances from the source with axis aligned perpendicular to the source. The enhancement type seismograph units allow repeated blows and summing of the associated wave forms into a culminative storage register.

The fact that shear wave polarity can be reversed and the compressional wave polarity cannot leads to a useful method of cancelling out the compressible wave. In the field, a seismic wave form is produced by striking the impact head 24 in one direction and digitally summing the received event in the seismograph's memory. By reversing the mode and direction of impact and then summing the corresponding received wave form into the same memory, the compressional wave as well as noise tends to be cancelled out. This leaves only the amplified shear wave.

It was this method which was originally selected for use in isolating the shear wave from a complex seismic event. It was found, however, that the torsional wave generator 10 of the present invention actually generated a very low amplitude compressional wave. In fact, in practice the compressional wave trace was practically nonexistant. In such case, the shear wave generated appeared to be very clear and distinct.

Figure 3A:
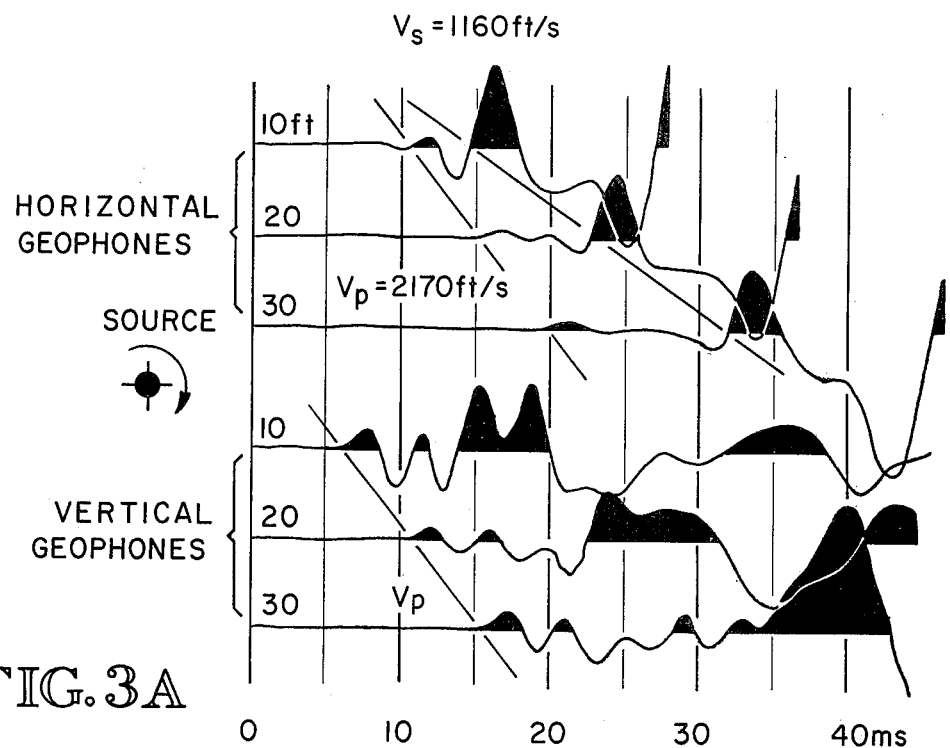
FIG. 3a is a graphic illustration of field test data representing shear and compressional wave velocities for a clockwise impact.
Figure 3B:
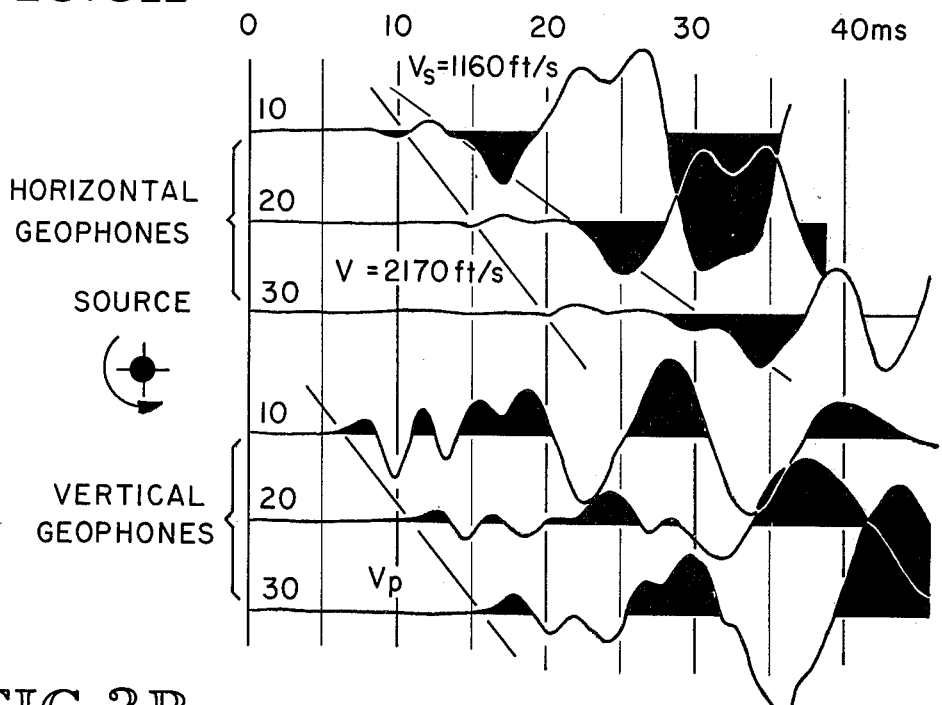
FIG. 3b is similar to FIG. 3a except the impact is counterclockwise.

FIGS. 3a and 3b show an example of field data obtained by the torsional shear wave generator 10. A pair of horizontal and vertical geophones are placed at distances of 10, 20 and 30 feet from the source. FIG. 3a shows the records from a clockwise impact and FIG. 3b shows the records from a counterclockwise impact. It is evident from the records that the horizontal geophones receive well recognizable shear wave arrivals while the vertical geophones receive weak yet also recognizable compressional waves. In this way, both shear and compressional wave velocities are measured simultaneously. It is also noted that by changing the impact direction, the shear wave changes its polarity while the compressional wave polarity remains the same. In FIGS. 3a and 3b, shear wave velocity is referred to as $V_s$ and compressional wave velocity is referred to as $V_p$.

From the foregoing, it is appreciated that the torsional wave generator 10 of the present invention is both very practical and effective in isolating shear wave forms, and for ultimately enabling one to accurately and efficiently determine shear wave velocity.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A portable, lightweight and reusable torsional wave generator for producing seismic shear waves for use in investigating the earth's subsurface, comprising: a plurality of planar vane means radially projecting in parallel relationship about a longitudinal axis and projecting outwardly therefrom for engaging the earth; support means for rigidly supporting said vane means about said longitudinal axis such that said vane means may be driven into the ground, said support means including an elongated shaft having a longitudinal axis and a ground entry end; a ground entry end; a ground penetrating spike end secured to said ground entry end of said shaft for enabling said torsional wave generator to be directly driven into the ground; a horizontal connecting structure secured across a top portion of said vanes and said shaft opposite said spike end about a plane generally perpendicular to said longitudinal axis of said shaft; driving head means secured to said torsional wave generator generally above said horizontal connecting structure for receiving an impact force for allowing the torsional wave generator to be directly driven into the ground; a loading arm secured to said striking head means extending above the ground and projecting radially therefrom generally perpendicular to the longitudinal axis of said shaft, said loading arm including a pair of sides extending laterally from said vanes and shaft; and striking surface means secured outwardly on at least one side of said loading arm for receiving an impact blow thereagainst, whereby a shear wave may be generated by striking said striking surface with an impact blow.

2. The torsional wave generator of claim 1 including four generally equally spaced fins projecting outwardly.

3. The torsional shear wave generator of claim 1 wherein each of said fins includes a beveled leading edge about the lower portion thereof and wherein each bevel leading edge is tapered such that the width of each fin becomes progressively smaller towards the driving spike end of said torsional shear wave generator.

4. A method of generating a shear wave with a portable, lightweight, reusable torsional wave generator of the type having a plurality of elongated vanes that are adapted to project downwardly into the ground and which radially project from a center support structure interiorly of said vanes and which further includes a laterally projecting loading arm that projects radially from an above-ground portion of said torsional wave generator and which includes a pair of sides and an elongated axis, said method of generating a shear wave comprising the steps of: driving a ground penetrating end of said torsional wave generator directly into the ground by hammering a top portion thereof with a striking implement so as to cause the torsional wave generator and the vanes thereof to be forced into the ground; penetrating the ground with a spike end secured to the ground penetrating end of said torsional wave generator; surrounding said vanes with only dirt and natural occurring earth composition that exists in the area where said torsional wave generator is driven into the ground; striking one side of said loading arm generally perpendicular to the longitudinal axis thereof at a radial point about an outer end portion thereof causing said torsional wave generator to rotate and the vanes thereof to engage the surrounding earth; and removing said torsional wave generator by pulling the same from the earth after sufficient data has been taken in order that the same can be used again in another locality.

* * * * *